July 22, 1958  A. M. MURDOCH  2,844,741
MEANS FOR TRANSMITTING AND RECEIVING
ULTRASONIC SHEAR WAVE MOTION
Filed Jan. 31, 1956
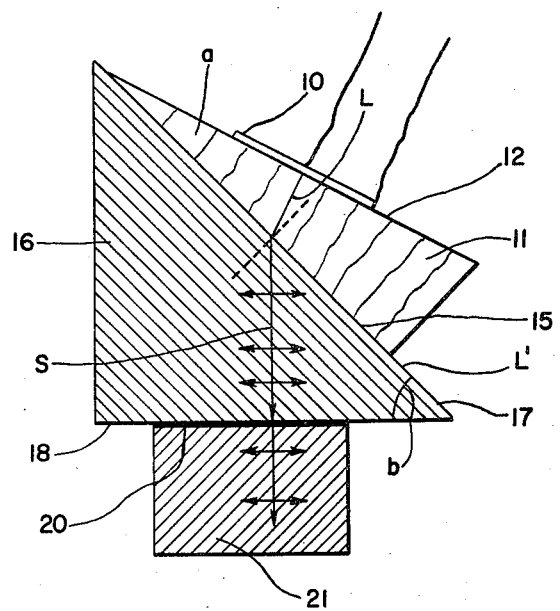

United States Patent Office 2,844,741
Patented July 22, 1958

2,844,741
MEANS FOR TRANSMITTING AND RECEIVING ULTRASONIC SHEAR WAVE MOTION

Andrew M. Murdoch, Bethel, Conn., assignor to Sperry Products, Inc., Danbury, Conn., a corporation of New York Application January 31, 1956, Serial No. 562,461

2 Claims. (Cl. 310—8.5)

This invention relates to a method of producing and detecting ultrasonic beams of transverse wave motion. Ultrasonic wave motion is one of three types—longitudinal or compressional, transverse or shear, and surface. The methods heretofore proposed for transmitting a beam of transverse or shear waves into an object were essentially those shown in the patent to Firestone, No. 2,439,130, granted April 6, 1948, wherein the transducer consisted of a Y-cut crystal, and in the patent to Carlin, No. 2,527,986, granted October 31, 1950, wherein the transducer consisted of a longitudinal wave generator which may take the form of a piezo electric element such as a quartz crystal mounted on a wedge. The angle of the wedge was such that when longitudinal waves were transmitted by the piezo electric crystal through the wedge, such waves were refracted on entering the specimen having a greater velocity and with which the wedge engaged. Longitudinal waves, when refracted within an object at the interface, produce two types of waves, i. e., fast moving longitudinal waves and slow moving transverse waves. Since longitudinal waves travel faster than transverse waves in a given material, the longitudinal waves were refracted to a greater degree, and by increasing the angle of incidence, a critical point was reached where the longitudinal waves disappeared from the object, leaving only the shear waves therein. The limitation of this method resides in the fact that the longitudinal acoustic velocity in the test specimen must be greater than the longitudinal acoustic velocity in the wedge on which the crystal is mounted, otherwise the necessary refraction of the longitudinal waves would not take place. Thus, for instance, it is not practical to use Carlin's method for generation of shear waves only in materials such as methyl methacrylate which has a very low acoustic velocity. It would be impractical to provide a wedge which would yield a sufficiently high angle of incidence to obtain the desired result.

It is, therefore, one of the principal objects of this invention to provide a method whereby only shear waves may be generated within any type of material regardless of the longitudinal acoustic velocity of the material.

It is another object of this invention to provide means for generating shear wave motion within any type of material without substantial loss of intensity.

It is a further object of the invention to provide means whereby shear wave motion may be generated and received in any type of material in a direction normal to the entering surface.

Further objects and advantages of this invention will become apparent in the following description thereof.

The accompanying drawing comprises a single figure, partly diagrammatic, showing one form of this invention.

Referring to the drawing, there is disclosed a transducer in the form of a piezo electric element such as quartz crystal or barium titanate 10 which may be energized from any suitable high frequency electric oscillation generator to cause the crystal to vibrate mechanically at the generated high frequency. The crystal is mounted upon a wedge 11 having an angle $a$. The crystal will generate lognitudinal waves which will enter the wedge 11 normal to the entering surface 12 thereof. Another surface 15 of the wedge 11 is mounted upon a second wedge 16, the surface 15 engaging the surface 17 of the wedge 16. The longitudinal beam L generated within the wedge 11 will strike the entering surface 17 of wedge 16 at an angle of incidence $a$ due to the angle $a$ of the wedge. On entering wedge 16, the longitudinal beam will generate two types of waves, i. e., fast moving longitudinal waves and slow moving transverse or shear waves. Since longitudinal waves have a greater velocity, they will be refracted to a greater degree than the shear waves S. By choosing the proper angle of incidence $a$ and the proper materials of wedges 11 and 16 having the necessary relative acoustic velocities, the refraction of the longitudinal waves L can be increased to the critical angle of refraction where the waves L' will be refracted so that said waves cannot exist in the wedge 16, and only shear waves S will remain in the wedge. For this purpose, the material of wedge 16 must have a higher longitudinal acoustic velocity than the material of wedge 11. The shear waves will travel to the exit surface 18 of the wedge and by choosing the correct angle $b$, the shear waves S may be caused to strike the exit surface 18 normally.

The transducer comprising the piezo electric element 10, the wedges 11 and 16, the wedge 16 having higher acoustic velocity than wedge 11, constitute a shear wave generating transducer which may now be employed to generate or receive shear waves in any type of material regardless of the acoustic velocity of the material, and free from any interfering longitudinal waves. For this purpose, the exit surface 18 of wedge 16 may be placed in contact, through a suitable couplant, with an entering surface 20 of an object or speciment 21 in which the shear waves are to be generated. The shear waves S striking surface 18 normally will also strike surface 20 normally, and since the angle of incidence is zero, the shear waves will not generate longitudinal waves as they would if the angle of incidence were greater than zero.

Having described my invention, what I claim and desire to secure by Letters Patent is:

1. A transducer for producing and receiving ultrasonic transverse wave motion in a specimen comprising a piezoelectric element adapted to generate longitudinal vibrations, a first wedge having an entering surface in effective engagement with the piezoelectric element so that longitudinal vibrations are generated in said wedge, said wedge having a leaving surface, a second wedge having an entering surface in engagement with the leaving surface of the first wedge so that the longitudinal vibrations in the first wedge will cause vibrations in the second wedge, the acoustic velocity of the second wedge being greater than the acoustic vibration of the first wedge, the angle between the entering and leaving surface of the first wedge being at least equal to the critical angle where longitudinal waves no longer exist in the second wedge and only transverse waves remain therein, said second wedge having a leaving surface adapted to engage the entering surface of a specimen.

2. A transducer for producing and receiving ultrasonic transverse wave motion in a specimen as specified in claim 1, in which the angle between the entering and leaving surfaces of the second wedge is equal to the angle of refraction of the vibrations in the second wedge so that the transverse waves transversing the second wedge strike and leave second surface normally.

References Cited in the file of this patent

UNITED STATES PATENTS

| 2,602,101 | Mesh | July 1, 1952 |
| 2,602,102 | Webb | July 1, 1952 |
| 2,709,760 | Volkenburg | May 31, 1955 |
| 2,725,491 | Haswell | Nov. 29, 1955 |